United States Patent [19]

Schneider

[11] 3,903,455

[45] Sept. 2, 1975

[54] ARRANGEMENT FOR ADJUSTING THE RASTER SIZE AND LINEARITY IN A TELEVISION CAMERA

[75] Inventor: Hans-Dieter Schneider, Gross-Gerau, Germany

[73] Assignee: Robert Bosch Fernsehanlagen G.m.b.H., Darmstadt, Germany

[22] Filed: Mar. 28, 1973

[21] Appl. No.: 345,787

[30] Foreign Application Priority Data

Apr. 7, 1972 Germany ............................ 2216728

[52] U.S. Cl. ................................................ 315/397

[51] Int. Cl. ............................................ H01j 29/76

[58] Field of Search ......... 315/27 TD, 27 R, 25, 26, 315/23; 178/7.5 R, 7.5 SE

[56] References Cited

UNITED STATES PATENTS

| | | | |
|---|---|---|---|
| 2,579,627 | 12/1951 | Tourshou | 178/7.5 SE |
| 2,580,977 | 1/1952 | Tourshou et al. | 178/7.5 SE |
| 2,587,420 | 2/1952 | Wendt | 315/27 R |
| 2,606,306 | 8/1952 | Bridges | 178/7.5 SE |
| 3,463,962 | 8/1969 | Bazin | 315/24 |

*Primary Examiner*—Richard A. Farley
*Assistant Examiner*—J. M. Potenza
*Attorney, Agent, or Firm*—Michael S. Striker

[57] ABSTRACT

The deflection coil and deflection signal generator of the camera are located remote from one another and connected by different conductor lengths depending on the distance between them. A coil having a bifilar winding and a movable iron core is connected in series with the deflection coil for adjusting the raster size for different lengths of the connecting conductors. A variable resistance connected in series with one winding of the bifilar windings allows linearity adjustment for different conductor lengths.

8 Claims, 2 Drawing Figures

ARRANGEMENT FOR ADJUSTING THE RASTER SIZE AND LINEARITY IN A TELEVISION CAMERA

BACKGROUND OF THE INVENTION

The present invention relates to a circuit arrangement for adjusting the raster size and linearity in a television camera wherein the deflection signal generator means and the deflection coils are located remote from one another and are connectable by conductors of different lengths, depending on the distance between them.

While horizontal raster size and linearity adjustments are known for standard television cameras and receivers, a special problem arises in portable television cameras such as are used, for example, by news reporters. In this type of camera the equipment is divided into two parts, the first of which is hand-held, while the second is generally carried on the back of the cameramen. The hand-held part usually contains only those portions of the camera which are absolutely essential for signal pickup, that is the objective lens, possibly a beam splitter, and of course the pickup tube or tubes with the associated deflection coil system. The circuitry required for the further processing of the television signals, as well as the deflection signal generator means for supplying the current to the deflection coils are located in a separate portion of the equipment, the so-called electronics pack, which may, for example, be carried on the back of the cameramen. The pickup unit and the electronics pack are connected by means of a cable which carries the supply lines for energizing the pickup tube or tubes and carries the picked up signals back for further processing to the electronics pack.

Obviously different lengths of connecting cable (conductor means) will be required under different circumstances. The different capacitances associated with the different lengths of cable would result in a lack of symmetry, which in turn would cause strong transient effects to take place in the deflection circuit at the edge of the raster. These effects cannot be obviated by the raster size and linearity adjustment means which are present in the conventional television camera wherein such a cable connection between the deflection signal generator means and the deflection coils does not exist.

SUMMARY OF THE INVENTION

It is an object of the present invention to furnish an arrangement which is suitable for adjusting the raster size and linearity in a television camera wherein the deflection coils are situated remote from the deflection signal generator means.

The present invention comprises adjustment coil means having a bifilar winding including a first and a second winding connected in series with each deflection coil. The adjustment coil means have an adjustable iron core for effecting the correct raster size. Further the present invention comprises variable resistance means connected in series with the first winding of the two windings constituting the bifilar winding, external adjustment of the variable resistance means causing an adjustment of the linearity of the raster. The use of the bifilar windings prevents the oscillations which would otherwise occur at the raster edge due to the capacitance introduced by the connecting cables.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
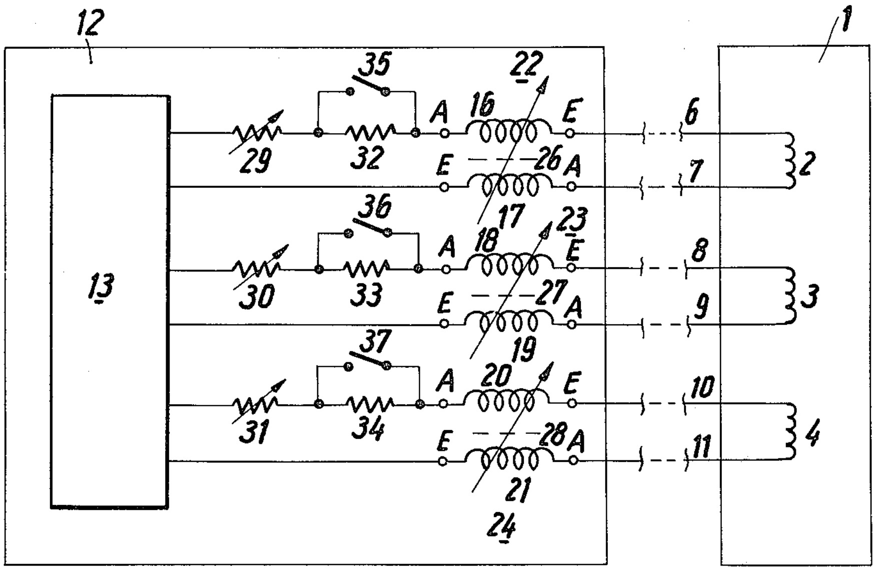
FIG. 1 is a schematic diagram showing the arrangement of the present invention.

A preferred embodiment of the present invention will now be described with reference to the drawing.

A housing 1 contains deflection coils 2, 3 and 4. This is the hand-held portion which of course also contains the pickup tubes which are not shown. Deflection coils 2, 3 and 4 are connected through conductor means namely conductors 6, 7; 8, 9; and 10, 11, respectively, to the deflection coil generator means indicated by block 13 in FIG. 1. Adjustment coil means 22, 23 and 24 are connected between coils 2, 3 and 4, respectively, and the corresponding portions of the deflection signal generator means. Specifically, adjustment coil means 22 comprise a first winding 16 connected through conductor means 6 to one terminal of coil 2 and a second winding 17 connected through conductor means 7 to the other terminal of deflection coil 2. As indicated by an arrow through coils 16 and 17, the variable iron core 26 is used to vary the inductivity of the coils upon external adjustment. Similarly, adjustment coil 23 has a first winding 18 connected through a conductor 8 to one terminal of deflection coil 3 and a second winding 19 connected to the other terminal of deflection coil 3 through a conductor 9. Again a variable iron core 27 forms part of adjustment coil 23. Similarly deflection coil 4 has one terminal connected through conductor 10 to one terminal of the first winding 20 of the bifilar winding of adjustment coil means 24. The other winding of the bifilar winding, labelled 21 in FIG. 1, is connected through a conductor 11 to the other terminal of deflection coil 4. Again a variable iron core 28 is furnished for adjustment of raster size.

Figure 2:
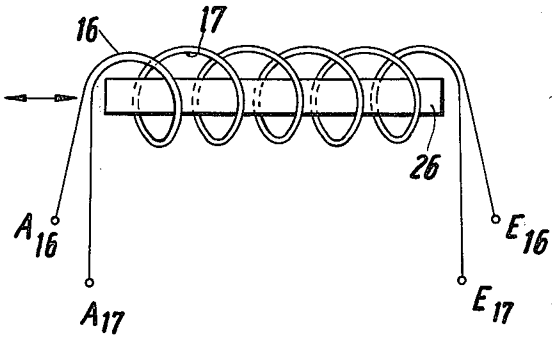
FIG. 2 is a schematic diagram of adjustment coil means having a bifilar winding suitable for use in the circuit of FIG. 1.

The adjustment coil means are shown in more detail in FIG. 2. While the terminals are labelled in accordance with the adjustment coil 22 connected to deflection coil 2, the other adjustment coil means are identical. Terminals A16 and E16, as well as terminals A17 and E17 are the same terminals having the corresponding indication in FIG. 1. The use of the windings wound as shown in FIG. 2 and connected as shown in FIG. 1, serves to suppress the oscillations which result from the capacitance introduced by the connecting cables. The iron cores 26, 27 and 28 allow adjustment of the raster size of each pickup tube.

For adjustment of raster linearity a variable resistor 29, 30 and 31 is connected between windings 16, 18 and 20, respectively, and the deflection signal generator means 13. Further, it will be noted that a fixed resistor 32, 33 and 34 is connected, respectively, in series with variable resistors 29, 30 and 31. Switches 35, 36 and 37 are provided for short-circuiting resistors 32, 33 and 34 respectively. It should be noted that these switches are mechanically intercoupled for simultaneous operation. The purpose of these switches and fixed resistors is as follows: Let it be assumed that the length of the connecting cables 6-11 is to be changed, for example, from one meter, which may be the situation when the cameraman is carrying unit 12 on his back, to, for example, 15 meters, which may be the situation when the cameraman leaves the electronic pack 12 in one location while carrying unit 1 along to a remote location. For such a predetermined change in length, it is only necessary that the cameraman activate switches 35, 36 and 37, closing same when changing the cables from a one meter to a 15 meter length. Thus each change in a cable length does not have to be accompanied by a linearity adjustment which might be annoying and time consuming.

The above will make it clear that the present invention is a simple and economical arrangement for compensating for the different capacitances which are introduced into the circuit by the different cable lengths interconnecting the electronic pack and the actual camera unit in a portable television camera. The invention is particularly effective when applied to the horizontal deflection circuit of a color television camera, but is not limited thereto.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims:

What is claimed as new and desired to be protected by Letters Patent is set forth in the appended claims:

1. In a television camera having deflection signal generator means for generating deflection signals, at least one deflection coil located remote from said deflection signal generator means for generating a raster in response to said deflection signals, and first and second conductor means for connecting said deflection coil to said deflection signal generator means, said conductor means having a different length for different distances between said deflection coil and said deflection signal generator means: an arrangement for adjusting the raster size and linearity for different lengths of said conductor means, comprising, in combination, adjustment coil means having a bifilar winding including a first and second winding connected in series with said deflection coil, and adjustable iron core means located within said adjustment coil means for adjusting said raster size; adjustable resistance means connected in series with said first winding for adjusting said linearity; fixed resistance means connected in series with said variable resistance means; and externally operable switch means connected in parallel with said fixed resistance means for short-circuiting said fixed resistance means upon external activation.

2. An arrangement as set forth in claim 1, further comprising first housing means for housing said deflection signal generator means, and second housing means for housing said deflection coil.

3. An arrangement as set forth in claim 1, wherein said adjustment coil means are physically located in proximity to said deflection signal generator means.

4. An arrangement as set forth in claim 1, further comprising fixed resistance means connected in series with said variable resistance means, and externally operable switch means connected in parallel with said fixed resistance means for short-circuiting said fixed resistance means upon external activation.

5. An arrangement as set forth in claim 1, wherein said television camera is a color television camera having a first, second and third deflection coil; wherein said first and second conductor means comprise first and second conductor means for each of said deflection coils; wherein said adjustment coil means comprise first, second and third adjustment coil means for, respectively, said first, second and third deflection coil; and wherein said variable resistance means comprise a first, second and third variable resistor connected in series with said first, second and third first windings of said first, second and third adjustment coils, respectively.

6. An arrangement as set forth in claim 1, wherein said deflection coil is the horizontal deflection coil, and wherein said adjustment coil means and said variable resistance means respectively adjust the size of said raster and the linearity of said raster in the horizontal direction.

7. In a color television camera having deflection signal generator means for generating deflection signals, a first, second and third deflection coil located remote from said deflection signal generator means for generating rasters in response to said deflection signals, and first and second conductor means for connecting each of said deflection coils to said deflection generator means, said conductor means having a different length for different distances between said deflection coils and said deflection signal generator means: an arrangement for adjusting the raster size and linearity for different lengths of said conductor means, comprising, in combination, first, second and third adjustment coil means for adjusting the raster produced by said first, second and third deflection coil respectively, said first, second and third adjustment coil means each having a bifilar winding including a first and second winding connected in series with a corresponding one of said deflection coils and adjustable iron core means located within each of said adjustment coil means; and adjustable resistance means including a first, second and third variable resistor connected in series with said first, second and third first windings of said first, second and third adjustment coil means, respectively, for adjusting said linearity.

8. In a television camera having deflection signal generator means for generating AC deflecting signals, at least one deflection coil located remote from said deflection signal generator means for generating a raster in response to said AC deflection signals, and first and second conductor means for transmitting said AC signals from said deflection signal generator means to said deflection coil, said conductor means having a different length for different distances between said deflection coil and said deflection signal generator means: an arrangement for adjusting the raster size and linearity for different lengths of said conductor means, comprising, in combination, adjustment coil means having a bifilar winding including a first and second winding connected in series with said deflection coil, and adjustable iron core means located within said adjustment coil means for adjusting said raster size; and adjustable resistance means connected in series with said first winding for adjusting said linearity.

* * * * *